United States Patent
Bookbinder et al.

(10) Patent No.: US 9,604,492 B2
(45) Date of Patent: Mar. 28, 2017

(54) DURABLE GLASS ARTICLES FOR USE AS WRITABLE ERASABLE MARKER BOARDS

(71) Applicant: CORNING INCORPORATED, Corning, NY (US)

(72) Inventors: Dana Craig Bookbinder, Corning, NY (US); Jeffrey John Domey, Elmira, NY (US); Matthew Wade Fenton, Elmira, NY (US); David Lee Weidman, Corning, NY (US)

(73) Assignee: Corning Incorporated, Corning, NY (US)

( * ) Notice: Subject to any disclaimer, the term of this patent is extended or adjusted under 35 U.S.C. 154(b) by 318 days.

(21) Appl. No.: 14/282,570

(22) Filed: May 20, 2014

(65) Prior Publication Data
US 2014/0255903 A1  Sep. 11, 2014

Related U.S. Application Data

(63) Continuation-in-part of application No. 14/093,649, filed on Dec. 2, 2013, now abandoned.
(Continued)

(51) Int. Cl.
*B43L 1/12* (2006.01)
*B43L 1/00* (2006.01)
(Continued)

(52) U.S. Cl.
CPC .............. *B43L 1/12* (2013.01); *B32B 17/064* (2013.01); *B43L 1/00* (2013.01); *B43L 1/002* (2013.01);
(Continued)

(58) Field of Classification Search
None
See application file for complete search history.

(56) References Cited

U.S. PATENT DOCUMENTS

| 2006/0073466 A1 | 4/2006 | Solomon |
| 2011/0045961 A1 | 2/2011 | Dejneka et al. |

(Continued)

FOREIGN PATENT DOCUMENTS

| CN | 2542455 | 4/2003 |
| DE | 20108703 | 9/2001 |

(Continued)

OTHER PUBLICATIONS

Weisstein, "Snell's Law," http://scienceworld.wolfram.com/physics/SnellsLaw.html, 2007.*
(Continued)

*Primary Examiner* — David Sample
(74) *Attorney, Agent, or Firm* — John T. Haran

(57) ABSTRACT

The invention relates to glass articles suitable for use as writable erasable marker boards. More particularly, disclosed is a strengthened glass article suitable for use as a writable erasable marker boards, wherein the glass sheet exhibits an ion exchanged glass having a front surface and a back surface and exhibiting a thickness of less than 2.0 mm and having a depth of layer (DOL) greater than 20 microns and a surface compressive strength of at least 300 MPa. The strengthened glass article exhibits certain optical properties which render it particularly suitable for use as a writable erasable marker boards electronic including: (1) shadow parallax to thickness ratio of less than 1 measured at a 60 degree incident light angle and for an index of refraction n; and, (2) a haze of less than 50%. Further disclosed is a markerboard with improved magnetic force attributes; sufficient to hold weak magnets in place.

29 Claims, 8 Drawing Sheets

Related U.S. Application Data

(60) Provisional application No. 61/731,962, filed on Nov. 30, 2012.

(51) Int. Cl.
  *C03C 21/00* (2006.01)
  *C03C 3/085* (2006.01)
  *C03C 3/087* (2006.01)
  *C03C 3/091* (2006.01)
  *C03C 3/093* (2006.01)
  *B32B 17/06* (2006.01)

(52) U.S. Cl.
  CPC .............. *B43L 1/008* (2013.01); *B43L 1/126* (2013.01); *C03C 3/085* (2013.01); *C03C 3/087* (2013.01); *C03C 3/091* (2013.01); *C03C 3/093* (2013.01)

(56) References Cited

U.S. PATENT DOCUMENTS

| | | | |
|---|---|---|---|
| 2011/0091860 A1 | 4/2011 | Supera et al. | |
| 2013/0004758 A1* | 1/2013 | Dejneka | C03C 3/087 |
| | | | 428/220 |
| 2013/0045375 A1* | 2/2013 | Gross | C03C 3/091 |
| | | | 428/220 |
| 2013/0101980 A1 | 4/2013 | Domey et al. | |

FOREIGN PATENT DOCUMENTS

| | | | | |
|---|---|---|---|---|
| DE | 20108703 U1 * | 9/2001 | ............ | B32B 17/06 |
| DE | 20108703 U1 | 10/2001 | | |
| DE | 202010009006 U1 | 3/2011 | | |
| EP | 0033325 | 8/1981 | | |
| WO | WO 2012082528 A2 * | 6/2012 | ............ | C03B 32/00 |

OTHER PUBLICATIONS

Schott Borofloat 33 brochure, Jun. 2010, no author.*
Machine Translation CN2542455.
ASTM D5767-95—"Standard Test Methods for Instrumental Measurement of Distinctness-of-Image Gloss of Coating Surfaces".
MMPA Standard No. 0100-00 "Standard Specifications for Permanent Magnet Materials".
PCT/US2013/072585 Search Report.
Patent Cooperation Treaty International Notification of Transmittal of the International Search Report and The Written Opinion of the International Searching Authority, international application No. PCT/US2014/038802; mailing date Feb. 19, 2015, 9 pages.

* cited by examiner

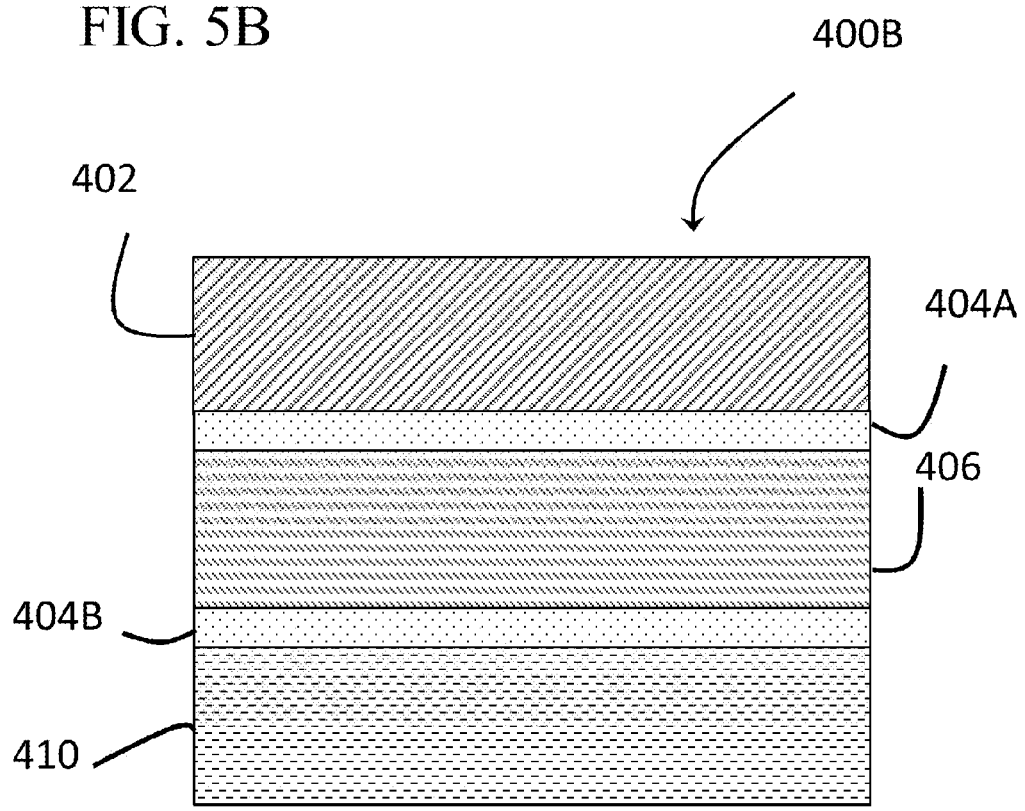

DURABLE GLASS ARTICLES FOR USE AS WRITABLE ERASABLE MARKER BOARDS

This application is a continuation-in-part of U.S. application Ser. No. 14/093,649 filed on Dec. 2, 2013, which claims the benefit of priority under 35 U.S.C. §119 of U.S. Provisional Application Ser. No. 61/731,962 filed on Nov. 30, 2012 the contents of which are relied upon and incorporated herein by reference in their entirety.

TECHNICAL FIELD

The invention is directed to glass materials that can be used as durable glass articles for use as writable erasable marker boards or devices. In particular, the invention is directed to an ion-exchanged glass article having requisite mechanical and optical characteristic properties which make it particularly suitable for use as writable erasable marker boards/devices.

BACKGROUND

A number of writeable erasable marker boards are described in the patent literature. For example, U.S. Publ. No. 2011/091860 (Supera et al.; 21 Apr. 2011) discloses a magnetic glass dry erase board that includes a glass sheet, a metal sheet, and an adhesive layer attaching the metal sheet to the glass sheet. The glass sheet is fabricated from low iron glass and may be fabricated from tempered glass. The metal sheet may be at least partially covered with a coating, and the coating may be visible through the glass sheet to provide a background color that enhances the visibility of text or drawings placed on the magnetic glass dry erase board. The metal sheet enables objects to be removably mounted on the magnetic dry erase board using magnets.

U.S. Publ. No. 2006/073466 (Solomon; 6 Apr. 2006) discloses a glass dry-erase board that includes a tempered glass sheet having a smooth surface and a frosted surface. A layer of opaque white paint is painted on the frosted surface. The paint layer and frosted surface provide a non-image-reflecting or non-specular background and relative sharp contrast background for writing. The glass dry-erase board can be mounted on the wall using spaced hook or picture hangers.

CN 2542455 Y (2 Apr. 2003) discloses a word board that includes a transparent glass board. The back of the glass board body is coated with a white paint or pasted with a white paper layer. The board body can also be formed by uniting two layers of thinner transparent glass boards and a white paper layer that is clipped in the middle to one of the glass board layers.

SUMMARY

In one embodiment disclosed is a high strength writable erasable marker board having improved optical and mechanical and magnetic force properties. In particular, the writable erasable marker boards are comprised of strengthened glass articles which exhibit minimal shadow parallax and haze.

More particularly, disclosed is a strengthened glass article suitable for use as a writable erasable marker board, wherein the glass sheet exhibits an ion exchanged glass having a front surface and a back surface and exhibiting a thickness of less than 2.0 mm and having a depth of layer (DOL) greater than 20 microns and a surface compressive strength of at least 300 MPa.

Still further, the strengthened glass article exhibits certain optical properties which render it particularly suitable for use as a writable erasable marker board. In particular, in those optical properties which make this glass suitable for use a writable erasable marker boards include: (1) shadow parallax to thickness ratio of less than or equal to 2/n measured at 60° incident light angle and for an index of refraction of n; (2) a haze of less than 50%.

Mechanical properties exhibited by the disclosed strengthened glass article which render it particularly suitable for use as a writable erasable marker boards include the following: (1) a fracture toughness of greater than 0.5 MPa·m$^{1/2}$; (2) an MOR of greater than 350 MPa; (3) a Vickers hardness of at least 600 kgf/mm$^2$; (4) a Young's Modulus of greater than 70 MPa; (5) a refractive index of greater than 1.5031 @ 633 nm.

In a still further embodiment, the glass article can be combined with a magnetic or ferrous steel backing and the combination of the thin glass article and the backing resulting in a writable erasable marker board wherein when the marker board is vertical, a permanent magnet with maximum energy product of less than 10 MGOe will remain attached to the glass sheet through magnetic force only.

Thus, one embodiment disclosed herein is a writable erasable marker board including a strengthened glass sheet having a front surface and a back surface wherein the glass sheet exhibits a thickness of less than 2.0 mm, a shadow parallax to thickness ratio of less than 1 measured at a 60 degree incident light angle and for an index of refraction of 1.5, and a transmission haze of less than 50%.

Another embodiment disclosed herein is a writeable erasable marker board including a strengthened glass sheet having a front surface and a back surface wherein the glass sheet exhibits a thickness of less than 2 0 mm, shadow parallax of less than or equal to 2.12/n when measured at a 60 degree incident light angle and for an index of refraction of n, and a transmission haze of less than 50%. The writeable erasable marker board also includes a magnetic or ferrous steel backing plate positioned on at least one side of the glass sheet such that when the marker board is vertical, a permanent magnet with maximum energy product of less than 10 MGOe will remain attached to the glass sheet through magnetic force only.

It is to be understood that both the foregoing general description and the following detailed description are exemplary of the present invention and are intended to provide an overview or framework for understanding the nature and character of the present invention as it is claimed. The accompanying drawings are included to provide a further understanding of the present invention and are incorporated in and constitute a part of this specification. The drawings illustrate various embodiments of the present invention and together with the description serve to explain the principles and operation of the present invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIGS. 5A-5D illustrate four embodiments of a writable erasable marker board which additionally include a strengthened glass sheet in combination with a magnetic or ferrous steel backing according to an embodiment disclosed herein.

DETAILED DESCRIPTION

Figure 1A:
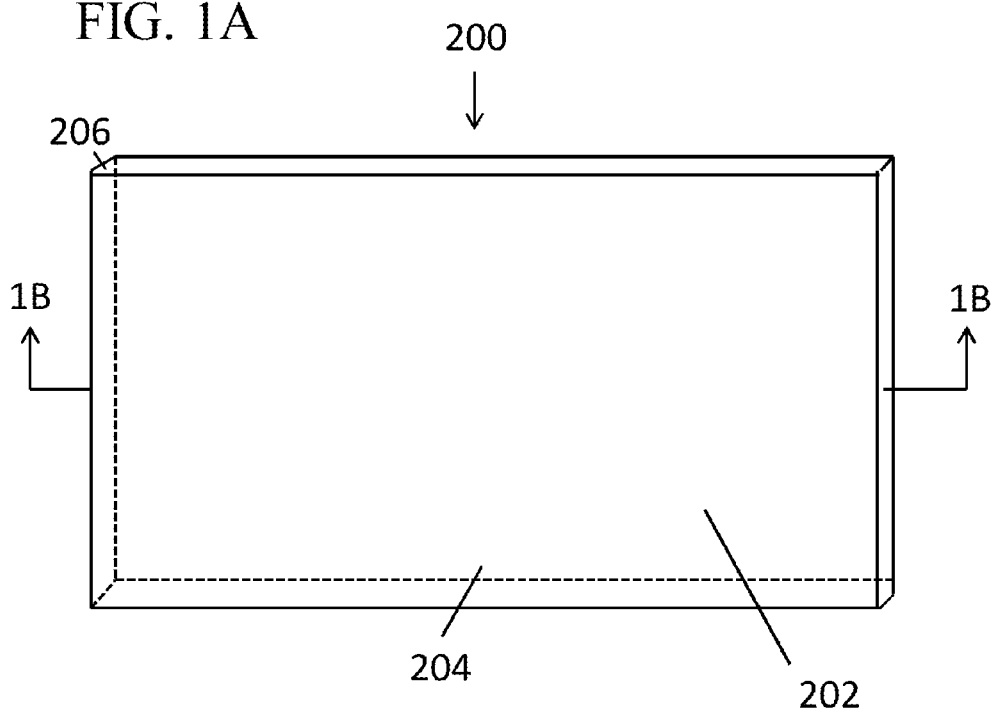
FIG. 1A shows a strengthened glass sheet/writable erasable marker board according to an embodiment disclosed herein.

In the following detailed description, numerous specific details may be set forth in order to provide a thorough understanding of embodiments of the present invention. However, it will be clear to one skilled in the art when embodiments of the present invention may be practiced without some of these specific details. In other instances, well-known features or processes may not be described in detail so as to focus on what is novel and non-obvious about the present invention. In addition, like or identical reference numerals may be used to identify common or similar elements.

FIG. 1A shows a writable erasable marker board or device comprised of a strengthened glass sheet 200 having a front surface 202, a back surface 204, and a uniform thickness of glass 206 between the front surface 202 and the back surface 204. In one embodiment, the glass thickness 206 is less than 2.0 mm. In another embodiment, the glass thickness 206 is less than 1.0 mm. In yet another embodiment, the glass thickness 206 is less than 0.7 mm. The glass will typically have a thickness from about 0.2 mm to about 2.0 mm. In some embodiments, the glass thickness may be 2.0 mm or greater. In one embodiment, the strengthened glass sheet 200 is a transparent glass sheet. In another embodiment, the strengthened glass sheet 200 is a color tinted transparent glass sheet or a colored opaque glass sheet. In some embodiments, where the strengthened glass sheet 200 is a transparent glass sheet, a decoration or printed image may be formed on the back surface 204 of the glass sheet 200. The decoration may be dense enough to cover the back surface 204, and of an opaque color, such that the back surface 204 appears opaque.

The front surface 202 is the writable erasable surface and is the surface that would be in the fore when the strengthened writable erasable device 100 is mounted. The front surface 202 may or may not have special surface attributes compared to the back surface 204. In some embodiments, the front surface 202 may be treated with agents that would facilitate surface writing and erasability. The back surface 204 is parallel and in opposing relation to the front surface 202.

Figure 1B:
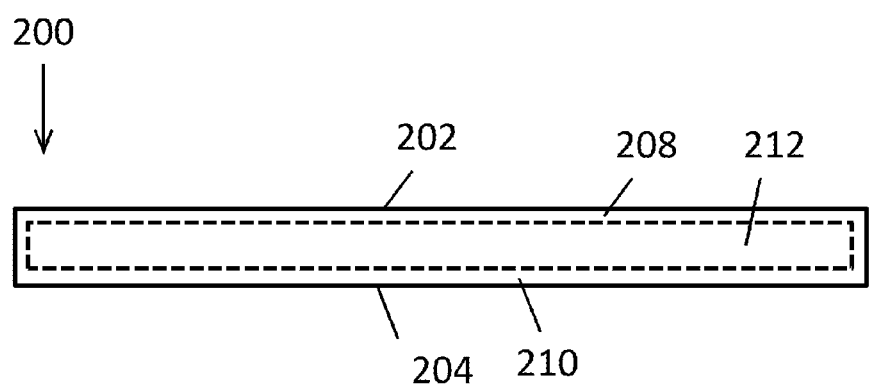
FIG. 1B shows a cross-section of a strengthened glass sheet along line 1b-1b of FIG. 1A.

The strengthened glass sheet 200 has at least one near-surface compressively-stressed region. FIG. 1B shows that the strengthened glass sheet 200 may have a compressively-stressed region 208 near its front surface 202 and/or a compressively stressed region 210 near its back surface 204. In a preferred embodiment, the compressively-stressed region 208 (or 210) is formed by subjecting a "virgin glass" to a chemical strengthening process, preferably an ion-exchange process. Here, a "virgin glass" is a glass that has not been subjected to a chemical strengthening process.

Although the preferred method for forming the compressively-stressed region 208 (or 210) is chemical strengthening, in some embodiments, thermal strengthening, such as tempering, may be used to form the compressively-stressed region 208 (or 210).

For the ion-exchange process, the virgin glass is an ion-exchangeable glass containing small alkali metal or alkaline-earth metal ions that can be exchanged for larger alkali or alkaline-earth metal ions. The ion exchange takes place in a molten bath containing the larger alkali or alkaline-earth metal ions. The virgin glass is dipped or immersed in the molten bath, and the smaller alkali or alkaline-earth metal ions in the virgin glass are displaced by the larger alkali or alkaline-earth metal ions in the molten bath. The larger ions occupying sites in the glass previously occupied by the smaller ions create the compressively-stressed region in the glass. The ion exchange occurs through the surface(s) of the glass. The depth of the ion-exchange into the glass determines the depth into the glass (or thickness, or layer depth) of the compressively-stressed region.

In one embodiment, a compressive stress of the compressively-stressed region 208 (or 210) is at least 300 MPa. Here, the "compressive stress of the compressively-stressed region" may be the highest or average or median compressive stress in the compressively-stressed region. The preceding may also be expressed as the strengthened glass sheet having a surface compressive strength of at least 300 MPa. In some embodiments, the compressive stress of the compressively-stressed region 208 (or 210) is at least 300 MPa, or least 400 MPa, or at least 500 MPa, or at least 600 MPa. The compressive stress of the compressively-stressed region 208 (or 210) will generally be a function of glass composition and layer depth of the compressively-stressed region into the glass. Preferably, the layer depth of the compressively-stressed region 208 (or 210) is at least 20 microns. For any given glass composition, this layer depth can be controlled to an extent by the conditions of the strengthening process, preferably ion-exchange process, used in forming the compressively-stressed region. In some embodiments, the layer depth of the compressively-stressed region 208 (210) is at least 20 microns, or at least 25 microns, or at least 30 microns, or at least 35 microns, or at least 40 microns, or at least 45 microns, or at least 50 microns.

The strengthened glass sheet 200 with the compressively-stressed region 208 (and/or 210) preferably has a central tensile-stressed region 212 with a tensile stress of at least 40 MPa. Here, the "tensile stress of the tensile-stressed region" may be the highest or average or median tensile stress in the tensile-stressed region. The preceding may also be expressed as the strengthened glass sheet having an internal tensile strength of at least 40 MPa. In some embodiments, the tensile stress may be greater than 40 MPa, or greater than 45 MPa, or greater than 50 MPa, but less than 65 MPa, or less than 60 MPa, or less than 55 MPa. The tensile-stressed region will generally occupy the region of the glass not occupied by the compressively-stressed region 208 (and/or 210). The tensile-stressed region 212 is formed at the same time that the compressively-stressed region 208 (and/or 210) is formed, i.e., when compression is created in one region of the glass, tension is created in another region of the glass adjacent to the compressed region. Example glass compositions for the conformable glass sheet and example methods of forming the conformable glass sheet will be described further below.

The glass material which is suitable for use as the strengthened glass article for use as the writable erasable marker board is preferably comprised of an alkali aluminosilicate glass, due to the fact that these type of glasses generally possess sufficient optical properties and mechanical durability, for this writable erasable device application, particularly when compared to plastic, soda lime glass and other non-alkali glass based materials.

Figure 2:
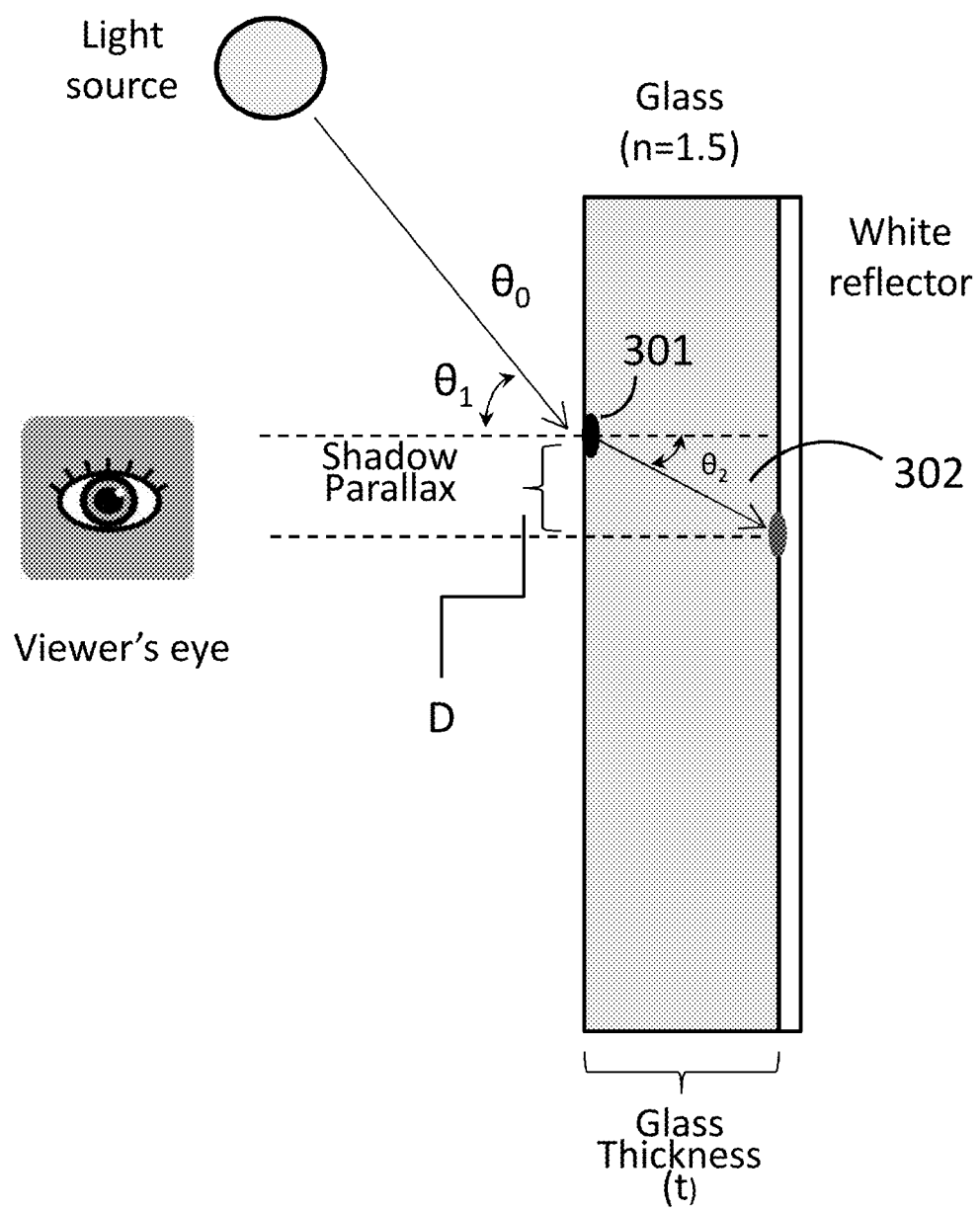
FIG. 2 schematically illustrates the shadow optical parallax optical characteristic which is exhibited by the embodiments disclosed.

The strengthened glass articles additionally exhibit certain optical properties which make it suitable for use as writable erasable marker boards. FIG. 2 illustrates what is referred to as the shadow parallax. Shadow parallax is the distance D between where the light ray (from a light source) contacts or impinges the first or front glass article surface 301 and where it contacts or impinges the second or back glass article surface 302; when that light ray contacts the first or front surface at an angle of incidence of 60° ($\theta_f$) and the glass exhibits a refractive index of n. In use, a mark placed on the front surface of the writeable erasable marker board will cast a shadow on the back surface which will be offset by distance D. If this offset is too large, markings such as text can become difficult to read for an observer. In particular, it is desirable that the strengthened glass article exhibit a shadow parallax D of less than about 2.12/n at an angle of incidence of 60°. For a typical glass composition with refractive index of about 1.5, the shadow parallax D is less than about 1.41 mm, which is acceptable for use with typical marker board markers. In some embodiments, it is desirable that the strengthened glass article exhibit a shadow parallax (D) to thickness (t) ratio of less than 1 when the refractive index (n) is 1.5. In other embodiments, it is desirable that the strengthened glass article exhibit a shadow parallax (D) to thickness (t) ratio of less than about 0.75 when the refractive index (n) is about 1.5. In other embodiments, it is desirable that the strengthened glass article exhibit a shadow parallax (D) to thickness (t) ratio of less than about 0.71 when the refractive index (n) is about 1.5.

Figure 3:
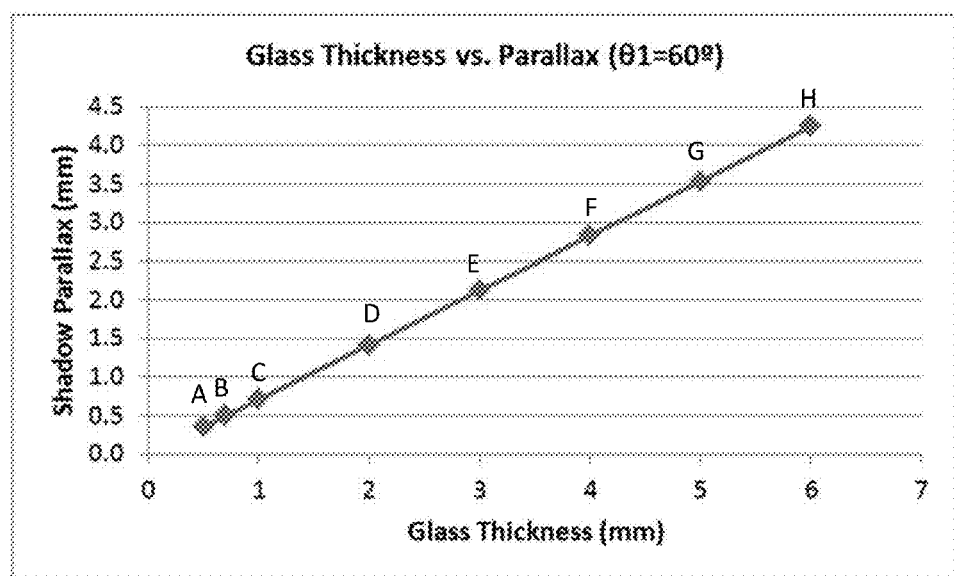
FIG. 3 illustrates the shadow parallax to thickness relationship/ratio for 4 examples and 4 comparative examples.

FIG. 3 illustrates shadow parallax as a function of glass thickness for 8 glass samples, with a glass refractive index of 1.5 and an angle of incidence of 60°. Samples A-D exhibit both the requisite thickness of less than 2 mm and a shadow parallax D of less than about 1.41 as well as a shadow parallax (D) to thickness (t) ratio of less than 1, while samples E-H exhibit thicknesses above 2 mm and larger shadow parallax values and thus are glass articles which are not suitable for use as writable erasable marker board.

The strengthened glass articles additionally exhibit certain mechanical properties which make it suitable for use as writable erasable marker board or device. Those properties, include, but are not limited to, a fracture toughness of greater than 0.75 MPa·m$^{1/2}$, a MOR of greater than 350 MPa, a Vickers hardness of at least 600 kgf/mm$^2$, a Young's Modulus of greater than 70 GPa, a thermal conductivity of less than 2.0 W/m° C., a refractive index of greater than 1.5031 @633 mm, and a surface compressive stress of greater than 300 MPa.

This requisite fracture toughness in excess of 0.75 MPa·m$^{1/2}$, in combination with the surface compressive stress exceeding 500 MPa and the MOR of greater than 350 MPa, all function to result in a writable erasable marker board which is sufficiently strong and durable so as to withstand typical consumer use/applications. One measure of this durability feature which the aforementioned ion-exchanged glass article is capable of meeting is the ability of the ion exchanged glass article to withstand a standard drop testing requirement involving 5 impacts/drops from a height of one meter onto a hard surface such as concrete or granite.

In a still further embodiment, the writable erasable marker board comprises a strengthened glass which exhibits a fracture toughness of greater than 0.75 MPa·m$^{1/2}$, and an MOR of greater than 475 MPa, preferably greater than 525 MPa.

In certain embodiments the glass article exhibits an almost-flat, transparent surface which is defined as a having at least one surface exhibiting a $R_a$ roughness of less than 50 nm, preferably less than 15 nm and/or having a distinctness of image of >95. In order to achieve this level of surface roughness, one option is to polish the surface using standard polishing techniques so as to achieve the requisite surface roughness of less than 50 nm, preferably less than 15 nm. Alternatively, the glass article can formed using a mold having a polished or non-textured surface so as to achieve the requisite surface roughness of less than 50 nm, preferably less than 15 nm. Alternatively, manufacturing methods such as fusion draw or float draw can be utilized to achieve this.

In certain other embodiments the glass article may appear hazy or opaque, meaning that the article possesses at least one surface exhibiting a $R_a$ roughness greater than 50 nm and sometimes as large as up to 15 μm or greater. The advantage of this opaque article feature is that the glass writable eraser marker board exhibits desirable anti-smudge or fingerprint resistant properties and/or antiglare properties. In order to achieve this level of surface roughness, resulting in the article appearing to be hazy or opaque, the glass article can be mechanically abraded (using standard abrasion techniques) and thereafter subject to an etching step which results in the removal of any subsurface damage which may have been created by the abrasion step. This combination of abrasion/etching steps can be performed either during or after the actual article formation. Alternatively, the glass article can formed using a mold having a textured surface so as to achieve the requisite surface roughness of greater than 50 nm.

The strengthened glass article showing hazy or opaque properties has a distinctness-of-reflected image (DOI) of less than 95 and, in some embodiments, less than 90; in other embodiments, less than 85; in other embodiments, less than 80; in other embodiments, less than 75; and, in other embodiments, less than 50. Unless otherwise specified, DOI values reported herein are measured at an incidence angle of 20° using a 2-side measurement method as described below. In another embodiment, the glass article has a DOI of less than 80, in still another embodiment, less than 40 and, in yet another embodiment, less than 20, when measured using the 2-side method. Lower DOI is generally preferred for antiglare functionality Depending on the specific application, however, performance trade-offs can occur when the DOI is lowered. For example, if DOI is lowered too much, haze may increase beyond acceptable limits. In another embodiment, the glass article has a DOI of less than 90 when measured at an angle of 20° from the specular direction using a 1-side sample preparation, as described below. The term "specular direction" refers the angle from the surface of the glass article at which a reflected image is viewed/observed, and is also referred to as the "specular viewing angle." DOI is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. In particular, DOI is calculated according to the equation:

$$DOI = \left[1 - \frac{Ros}{Rs}\right] \times 100, \quad (1)$$

where Rs is the relative amplitude of reflectance in the specular direction and Ros is the relative amplitude of reflectance in an off-specular direction. As described herein, Ros, unless otherwise specified, is calculated by averaging the reflectance over an angular range from 0.2° to 0.4° away from the specular direction. Rs is calculated by averaging the reflectance over an angular range of ±0.05° centered on the specular direction. Both Rs and Ros were measured using a goniophotometer (Novo-gloss IQ, Rhopoint Instruments) that is calibrated to a certified black glass standard, as specified in ASTM procedures D523 and D5767, the contents of which are incorporated by reference in their entirety. The Novo-gloss instrument uses a detector array in which the specular angle is centered around the highest value in the detector array. DOI was also evaluated using 1-side (black absorber coupled to rear of glass) and 2-side (reflections allowed from both glass surfaces, nothing coupled to glass) methods. The 1-side measurement allows the gloss, reflectance, and DOI to be determined for a single surface (e.g., a single roughened surface) of the glass article, whereas the 2-side measurement enables gloss, reflectance, and DOI to be determined for the glass article as a whole. The ratio Ros/Rs is calculated from the average values obtained for Rs and Ros as described above. As used herein, the term "20° DOI," unless otherwise specified, refers to DOI measurements in which the light is incident on the sample at 20° off the normal to the glass surface, as described in ASTM D5767. The measurement of either DOI or common gloss using the 2-side method is preferably carried out in a dark room or enclosure such that the measured value of these properties is zero when no sample is present.

Haze and DOI are simultaneously controlled to achieve optimal combinations in glass surfaces. Simultaneous control of haze and DOI yield more visually pleasing anti-glare surfaces, particularly for display applications, than control of either haze or gloss alone. This is because DOI is a much more accurate metric for matching the eye's response to blurring of reflected images, and a wider range of haze values can be created with low DOI levels than can be created with low gloss levels.

As used herein, the terms "transmission haze" and "haze" refer to the percentage of transmitted light scattered outside an angular cone of ±4.0° in accordance with ASTM procedure D1003. For an optically smooth surface, transmission haze is generally close to zero. Transmission haze of a glass sheet which is roughened on two sides ($Haze_{2-side}$) can be related to the transmission haze of a glass sheet having an equivalent surface that is roughened on only one side ($Haze_{1-side}$), according to the following approximation:

$$Haze_{2-side} \approx [(1-Haze_{1-side}) \cdot Haze_{1-side}] + Haze_{1-side}. \quad (2)$$

Haze values are usually reported in terms of percent haze. The value of $Haze_{2-side}$ obtained from Equation (2) must therefore be multiplied by 100%. In some embodiments, the glass article described herein has a transmission haze of less than about 50%; in other embodiments, less than about 40%; in other embodiments, less than about 30%; in other embodiments, less than about 20%; in other embodiments, less than about 10%; in other embodiments, less than about 5%; in other embodiments, less than about 3%; and in other embodiments, less than about 1%.

For some applications, it may be desirable to minimize the haze while maintaining low DOI with an anti-glare surface. In display applications, for example, a minimal haze will lead the to smallest amount of display contrast reduction from randomly placed ambient light sources scattering stray light towards the viewer, while maintaining low DOI (governed by small-angle-scattering) will preserve the anti-glare effect of blurring the borders of reflected images, such that reflections are rendered less sharp, less noticeable or less objectionable.

In some embodiments, the roughened surface has a RMS roughness in a range from about 50 nm up to about 500 nm, a distinctness of image (DOI) of less than about 85 and a transmission haze of less than 40%. In one such embodiment, the transmission haze is less than about 20% and the DOI is less than about 80. In another such embodiment, the transmission haze is less than about 10% and the DOI is less than about 75. In another such embodiment, the transmission haze is less than about 10% and the DOI is less than about 50. In another such embodiment, the transmission haze is less than about 5% and the DOI is less than about 85. In another such embodiment, the transmission haze is less than about 5% and the DOI is less than about 75. In another such embodiment, the transmission haze is less than about 5% and the DOI is less than about 50. In another such embodiment, the transmission haze is less than about 3% and the DOI is less than about 85. In another such embodiment, the transmission haze is less than about 3% and the DOI is less than about 75. In another such embodiment, the transmission haze is less than about 3% and the DOI is less than about 50. In another such embodiment, the transmission haze is less than about 1% and the DOI is less than about 85. In another such embodiment, the transmission haze is less than about 1% and the DOI is less than about 75. In another such embodiment, the transmission haze is less than about 1% and the DOI is less than about 50.

Figure 4A:
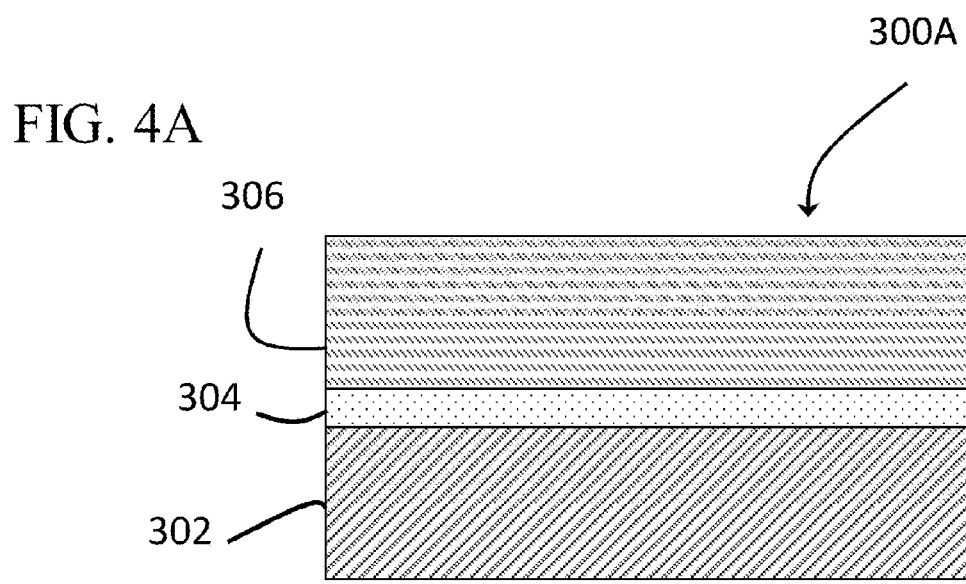
FIGS. 4A-4B illustrate three embodiments of a writable erasable marker board each of which comprises a strengthened glass sheet laminated and/or attached to a second film structure or layer.
Figure 4B:
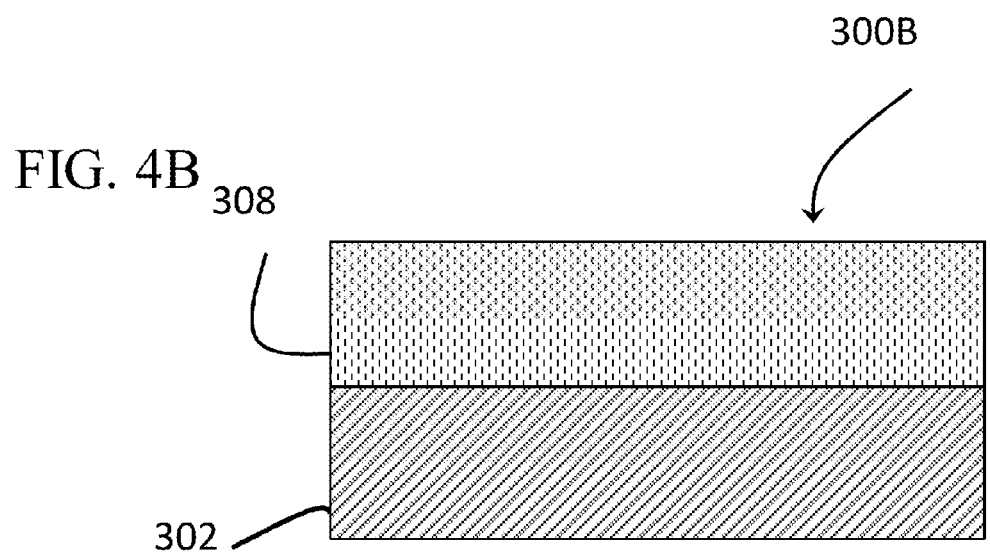

Referring now to FIGS. 4A-4B, illustrated therein are a series of writable/erasable markerboard embodiments wherein the markerboard includes, in addition to the strengthened glass article, an additional layer laminated to or otherwise attached to the strengthened glass article (e.g., through the use of an adhesive, including pressure-sensitive, solvent-based, water-based, heat-activated, photocurable, as well as e-beam curable adhesives.)

Specifically, FIG. 4A. illustrates a writable/erasable markerboard 300A which would be particularly useful for those applications where there exist requirements to reduce the risk of user injury or equipment damage resulting from glass fragments becoming separated from the main body of the markerboard in the event of glass breakage. This requirement is usually addressed by utilizing an organic (or plastic) film 306, such as an anti-splinter film or other material, which is attached to the strengthened glass article 302 through the use of an adhesive 304; it is critical that film 306 remain adhered to the strengthened glass article 302 after fracture and prevent fragments from separating from the main body. It is contemplated that this anti-splinter film embodiment can be one wherein the glass article and the organic (or plastic) film are simply laminated together without the use of an adhesive (e.g., where the film is a thermoplastic or thermoset polymer including a urethane, a polyester, a polyolefin, a polyacrylate, a polycarbonate, a vinyl polymer, and optionally comprising a silane or titanate adhesion promoter) (not shown).

An anti-splinter film, for example, which typically is comprised of an optically clear adhesive and a transparent film, may include a polycarbonate, a polyethylene terephthalate (PET), polyester, transflective, and/or an acrylic material, and may include multiple layers of film. Additional materials may be bonded or otherwise added between the glass panel and the film and/or behind the film. Suitable films which may be utilized to provide this anti-splinter functionality include OQ1030 Lexan®, available from General Electric Corporation, Mylar® or Melinex®, available from DuPont Corporation, or similar products such as polyester films available from Mitsubishi, SKC, or transflective films available from 3M. It is contemplated that other materials besides the aforementioned films can provide the requisite anti-film functionality, including paints or adhesives, so long as they are strongly adhered to the glass.

It is contemplated that this antisplinter, film in whatever form, may additionally include decorative functionality. For example, films of a variety of colors and/or films that have indicia, printed markings, pictures, illustrations, background color or other decorations can be utilized or the film may comprise electronic or magnetic properties.

In another embodiment, as illustrated in FIG. 4B, writable/erasable markerboard 300B includes a decoration film or layer 308 which is attached directly to the strengthened glass layer 302. The decorative layer can comprise any material which can be applied in a pattern to form a design which can be observed through the glass article as viewed from the opposite non-decorative glass surface side. Materials which may be useful for this decorative layer include paints, decals or inks (applied by, for example, spray, ink jet, screen print, or roller application).

Figure 5A:
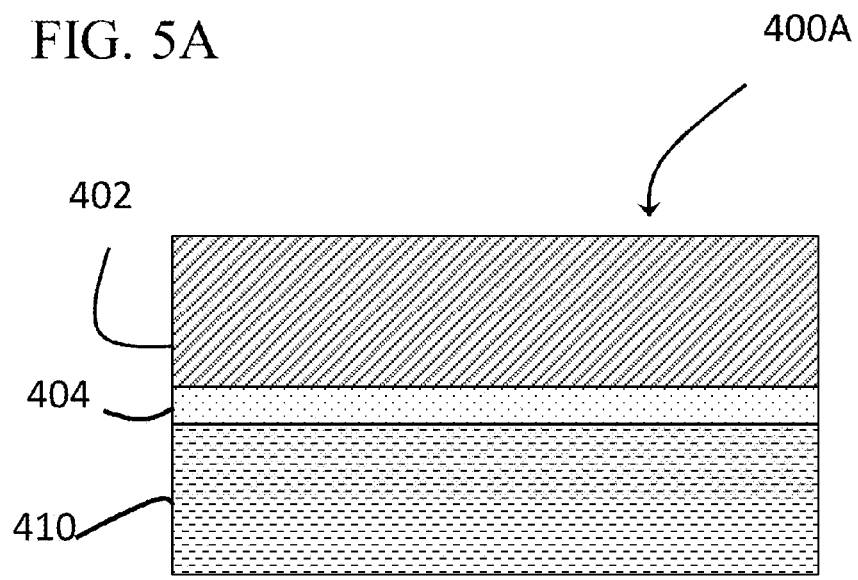

Referring now to FIGS. 5A-5D, illustrated therein is yet another series of writable/erasable markerboard embodiments. FIG. 5A illustrates the simplest form of this embodiment wherein markerboard 400A includes, in addition to the strengthened glass article 402, an additional ferrous steel or magnetic layer 410 positioned or attached to the strengthened glass article through the use of an adhesive 404.

In these writeable-erasable glass markerboards, it is desirable that items with magnetic properties are able to adhere to the front, writing surface of the markerboard when the markerboard is in a vertical orientation. This adherence is typically the result of a magnetic attraction between an item containing, for example, a permanent magnet and, for example, a ferrous steel backing plate attached to or adjacent to the back surface of the glass sheet. Items can contain magnets, have a surface layer of a magnetic material, or be primarily composed of a magnetic material, and include decorative ("refrigerator") magnets, erasers and pens, pen trays and other accessories, etc. With existing non-glass markerboards such as porcelain-on-steel, such items will adhere to the writing surface solely utilizing the magnetic force of weak, low-cost magnets. However, when thick glass is utilized, the magnetic force between the permanent magnet and the steel plate is too small to hold the magnet-containing item in place. Because of this, manufacturers are forced to utilize costly, high-strength magnets such as rare earth magnets. It is preferable to enable the use of relatively weak magnets for this application. By utilizing thin, strengthened glass exhibiting thickness ≤2.0 mm together with a ferrous steel plate or other magnetically-attractive material, "weak", low-cost magnets can be adhered to these writeable-erasable glass markerboards and the magnetic force is sufficient to maintain the magnets in place.

Magnetic properties are specified in various standards documents, such as, for instance, the Magnetic Materials Producers Association's MMPA Standard No. 0100-00 entitled Standard Specifications for Permanent Magnet Materials and references therein. Magnets are often specified by their Maximum Energy Product, often denoted (BH)max. "Weak" magnets are typically characterized in having Maximum Energy Product values ≤10 MGOe and sometimes ≤5 MGOe or even ≤1 MGOe. It has been found that thin, strengthened glass enables such weak magnets to adhere to the vertical glass surface with a ferrous steel backing plate, whereas much stronger magnets typically characterized by having Maximum Energy Product values >10 MGOe and often >20 MGOe, are required to enable adherence to thicker glass plates.

To summarize disclosed is a markerboard which includes, in addition to the strengthened glass article an additional ferrous steel or magnetic layer positioned or attached to at least one side of the strengthened glass such that when the marker board is vertical, a permanent "weak" magnet with maximum energy product of less than 10 MGOe, less than 5MGOe, less than 1 MGOe will remain attached to the glass sheet through magnetic force only.

Referring now to FIG. 5B, illustrated is another ferrous steel or magnetic layer containing writable/erasable markerboard embodiments. Writable/erasable markerboard 400B includes, in addition to the strengthened glass article 402, an organic (or plastic) film 406, such as an anti-splinter film or other material (as previously mentioned), which is attached to the strengthened glass article 402 through the use of an adhesive layer 404A. This embodiment further includes a ferrous steel or magnetic layer 410 positioned or attached to film 406 through the use of an adhesive 404B.

Figure 5C:
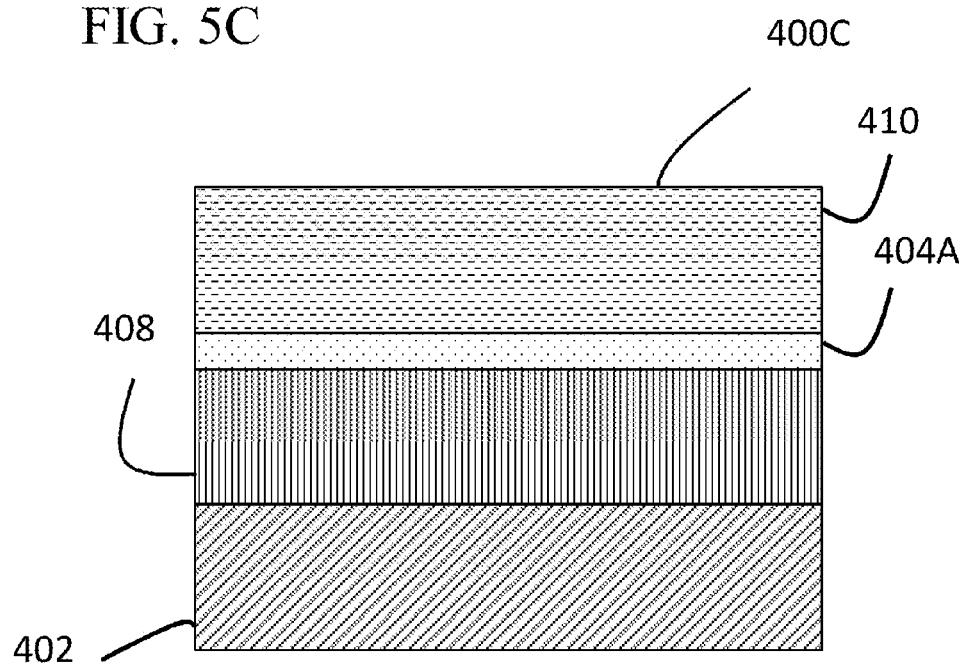

Referring now to FIG. 5C, a third ferrous steel or magnetic layer containing writable/erasable markerboard embodiment is shown. Similar to embodiments in FIGS. 5A and 5B, the writable/erasable markerboard 400C includes, in addition to the strengthened glass article 402, a ferrous steel or magnetic layer 410, positioned or attached via an adhesive 404A to a decoration film or layer 408 which is attached directly to the strengthened glass layer 402.

Figure 5D:
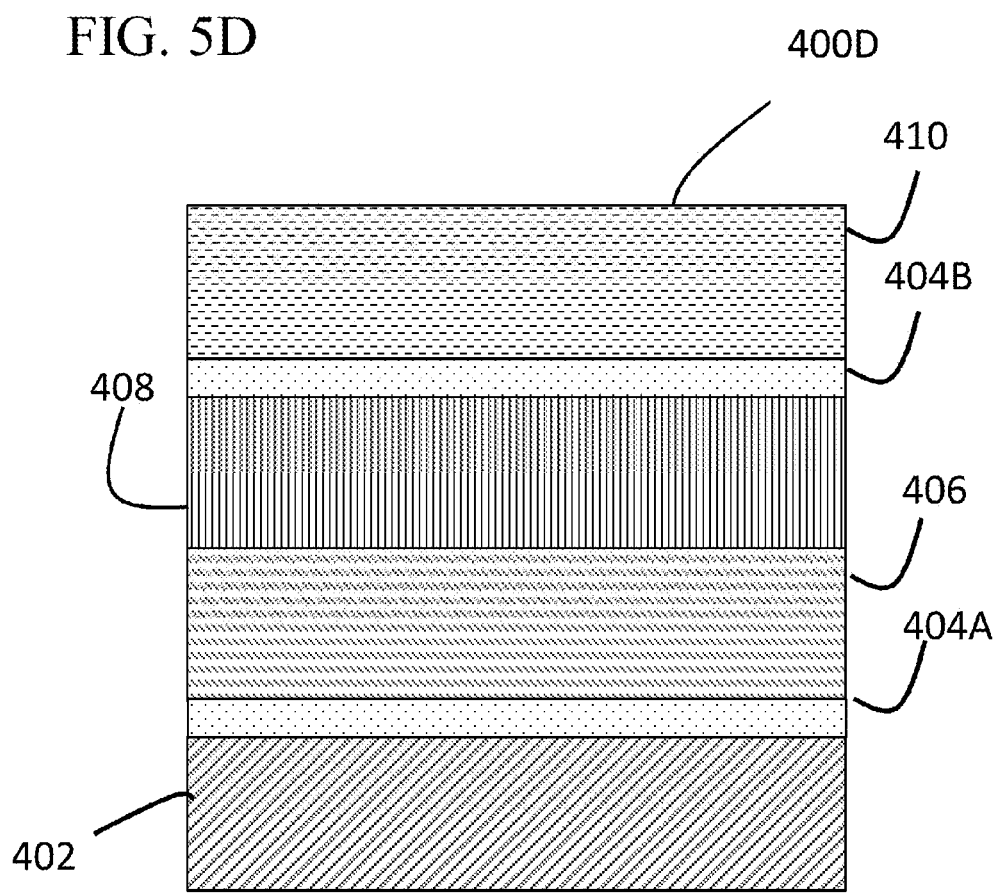

Referring now to FIG. 5D, illustrated is a final ferrous steel or magnetic layer containing writable/erasable markerboard embodiment which essentially includes all the aforementioned features. Writable/erasable markerboard 400D includes a ferrous steel or magnetic layer 410 positioned or attached via an adhesive 404B to a decoration film or layer 408 which is attached directly to an organic (or plastic) film 406, such as an anti-splinter film or other material (as previously mentioned). The first side of a strengthened glass layer 402 is positioned or attached via the use of a second adhesive 404A.

Alternative embodiments allow for variation of the layers or additional layers, for example such that the anti-splinter layer 406 is on the surface, adhered to the strengthened glass layer 402 by adhesive 404A, and the strengthened glass layer 402 is in direct contact with the decorative film 408.

As mentioned earlier, the writable erasable marker board or device includes mounting means for mounting the strengthened glass sheet 200 to an object. The mounting means can take on a variety of forms. In particular, the mounting means which may be suitable include the following: (1) a magnetic layer on the back surface of the strengthened glass sheet; (2) an adhesive layer on the back surface of the strengthened glass sheet; (3) a static cling layer on the back surface of the strengthened glass sheet; (4) one or more mounting holes formed in the strengthened glass sheet; (5) one or more glass sheet hanging elements attached to the strengthened glass sheet; and (6) one or more glass sheet framing elements attached to the strengthened glass sheet.

As mentioned hereinabove, the glass articles suitable for use as writable eraser marker boards comprises an alkali aluminosilicate glass material due to their sufficient chemical durability and mechanical properties, for this writable eraser marker boards application, particularly when compared to plastic and other non-alkali glass based materials.

A representative alkali aluminosilicate glass compositional family, suitable for use as writable eraser marker boards, comprises, in its broadest embodiment, in mole percent as oxides on a batched basis, 40-80% $SiO_2$, 0-28% $Al_2O_3$, 0-8% $B_2O_3$, 0-18% $Li_2O$, 0-10% $Na_2O$, 0-11% $1_2O$, 0-16% MgO, 0-10% $MgF_2$, 0-8% CaO, 0-15% $CaF_2$, 0-20% SrO, 0-12% BaO, 0-8% ZnO, 0-20% $P_2O_5$, 0-8% $TiO_2$, 0-5% $ZrO_2$, 0-1% $SnO_2$, 0-1 $Sb_2O_3$, 0-1% $As_2O_3$.

Another more specific embodiment of the suitable alkali aluminosilicate that is capable of being down drawn (more particularly fusion drawn) into thin glass articles which can be subsequently formed into writable eraser marker boards is shown below. The alkali aluminosilicate glass specifically comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $1_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %.

In a third embodiment, the alkali aluminosilicate glass comprises, consists essentially of, or consists of: 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; and 0 mol %≤CaO≤3 mol %.

In a fourth embodiment, alkali aluminosilicate glass comprises, at least 50 mol % $SiO_2$, less than 10 mol % $B_2O_3$, and at least 8 mol % $Na_2O$, wherein the aluminoborosilicate glass is ion exchangeable, wherein a ratio $$\frac{Al_2O_3(mol\ \%) + B_2O_3(mol\ \%)}{\Sigma modifiers(mol\ \%)} > 1,$$

wherein $Al_2O_3$(mol %) > $B_2O_3$(mol %) and the modifiers are $Na_2O$ and, optionally, at least one oxide selected from the group consisting of alkali metal oxides $R_2O$ other than $Na_2O$ and alkaline earth oxides RO, wherein the aluminoborosilicate glass has a Young's modulus of less than about 69 GPa, and wherein −6 mol % < $\Sigma$modifiers−$Al_2O_3$ < 3 mol %.

Regardless of whether the alkali aluminosilicate glass composition is capable of being down drawn into an initial sheet configuration, ultimately the glass selected for use as the writable erasable marked board or device should additionally exhibit good formability. As such, it should be capable of being easily formed in the desired writable erasable marker board or device. Specifically, it is desirable that the glass material utilized is capable of easily being formed into the desired writable erasable marker board or device through the utilization of standard processing including, but not limited to techniques such as pressing, sagging, vacuum sagging, sheet coin and combinations thereof.

Representative examples from the aforementioned alkali aluminosilicate glass compositional ranges are provided in Table 1.

TABLE 1

| Oxides | A Wt % | B Wt % | C Wt % | D Wt % | E Wt % |
|---|---|---|---|---|---|
| $SiO_2$ | 61.54 | 66.02 | 65.3 | 57.64 | 58.5 |
| $Al_2O_3$ | 16.24 | 13.62 | 16.92 | 21.2 | 21.51 |
| $B_2O_3$ | 0.65 | | | 7.27 | 5.2 |
| $Na_2O$ | 13.43 | 13.73 | 14.35 | 12.95 | 13.01 |
| $K_2O$ | 3.57 | 1.73 | 0.017 | 0.73 | 0.02 |
| MgO | 3.56 | 3.95 | 3.33 | 0.03 | 1.51 |
| CaO | 0.5 | 0.45 | | 0.08 | 0.03 |
| $ZrO_2$ | 0.02 | | 0.011 | 0.011 | |
| $SnO_2$ | 0.48 | 0.44 | 0.26 | 0.22 | 0.18 |
| $Fe_2O_3$ | 0.02 | 0.02 | 0.018 | 0.08 | |

It is envisioned that these thin strengthened alkali-alumino silicate based writable erasable marker boards can be formed into a laminate with a low modulus polymer and/or foam-type backing and be further utilized as a whiteboard device which provides the dual functionality of a sound damping architectural panel.

In some embodiments, the strengthened glass article can be used as a passive digital markerboard. In such instances, a coding pattern can be deposited on, or laminated to, the strengthened glass article. In some embodiments, the coding pattern can be deposited directly on a front or back surface of the strengthened glass surface, for example, by printing, such as inkjet printing or screen printing. In other embodiments, the coding pattern can be deposited on, or otherwise attached to, a substrate (e.g., paper or polymer film) and the substrate can be laminated to the strengthened glass surface (e.g., through the use of an adhesive, including pressure-sensitive, solvent-based, water-based, heat-activated, photo-curable, as well as e-beam curable adhesives) in a manner such that the coding pattern is disposed between the strengthened glass surface and the substrate. In some embodiments, the coding pattern can be a plurality of dots. The passive digital markerboard with the coding pattern can be used in conjunction with a transmitter/receiver device to record and transmit the information written on the passive digital markerboard to another device, such as a computer or mobile device. Examples of such a transmitter/receiver device include the Livescribe Smartpen and the Anoto Live Digital Pen.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:
1. A writable erasable marker board comprising:
a strengthened glass sheet having a front surface and a back surface wherein the glass sheet exhibits a thickness of less than 2.0 mm, a shadow parallax to thickness ratio of less than 1 measured at a 60 degree incident light angle, an index of refraction of 1.5, a transmission haze of less than 40%, an RMS roughness in a range from about 50 nm up to about 500 nm, and a distinctness of image (DOI) of less than about 85.
2. The writable erasable marker board of claim 1, wherein the strengthened glass article further exhibits a fracture toughness of greater than 0.75 MPa·m$^{1/2}$, an abraded MOR of greater than 350 MPa, a Vickers hardness of at least 600 kgf/mm$^2$, a Young's Modulus of greater than 60 GPa, and a surface compressive stress of greater than 300 MPa.

3. The writable erasable marker board of claim 1, wherein the strengthened glass sheet has a surface compressive strength of at least 300 MPa.

4. The writable erasable marker board of claim 1, wherein the strengthened glass sheet has at least one compressively-stressed region near the front surface or the back surface, and wherein the compressively-stressed region has a layer depth of at least 20 microns.

5. The writable erasable marker board of claim 1, wherein the strengthened glass article exhibits an MOR of greater than 475 MPa.

6. The writable erasable marker board of claim 1 further comprising a mounting means, wherein the mounting means is selected from the group consisting of (i) a magnetic layer on the back surface of the strengthened glass sheet, (ii) an adhesive layer on the back surface of the strengthened glass sheet, and (iii) a static cling layer on the back surface of the strengthened glass sheet.

7. The writable erasable marker board of claim 1 further comprising a mounting means, wherein the mounting means is selected from the group consisting of (i) one or more mounting holes formed in the strengthened glass sheet, (ii) one or more glass sheet hanging elements attached to the strengthened glass sheet, and (iii) one or more glass sheet framing elements attached to the strengthened glass sheet.

8. The writable erasable marker board of claim 1 wherein the glass is an ion-exchanged alkali-aluminosilicate glass.

9. The writable erasable marker board of claim 1, wherein the glass is an ion-exchanged alkali-aluminosilicate glass comprising, in weight percent as oxides on a batched basis, of 40-80% $SiO_2$, 0-28% $Al_2O_3$, 0-8% $B_2O_3$, 0-18% $Li_2O$, 0-10% $Na_2O$, 0-11% $K_2O$, 0-16MgO, 0-18% CaO, 0-15% $CaF_2$, 0-20% SrO, 0-12% BaO, 0-8% ZnO, 0-4% $P_2O_5$, 0-8% $TiO_2$, 0-5% $ZrO_2$, 0-1% $SnO_2$, 0-1 $Sb_2O_3$, and 0-1% $As_2O_3$.

10. The writable erasable marker board of claim 1, wherein the glass is an ion-exchanged alkali-aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≤$Li_2O$+$Na_2O$+$K_2O$≤20 mol % and 0 mol % ≤MgO+CaO≤10 mol %.

11. The writable erasable marker board of claim 1, wherein the glass is an ion-exchanged alkali-aluminosilicate glass comprising at least 50 mol % $SiO_2$, less than 10 mol % $B_2O_3$, and at least 8 mol % $Na_2O$, wherein the aluminoborosilicate glass is ion exchangeable, wherein a ratio $$\frac{Al_2O_3(\text{mol \%}) + B_2O_3(\text{mol \%})}{\Sigma\text{modifiers}(\text{mol \%})} > 1,$$

wherein $Al_2O_3$(mol %) >$B_2O_3$(mol %) and the modifiers are $Na_2O$ and, optionally, at least one oxide selected from the group consisting of alkali metal oxides $R_2O$ other than $Na_2O$ and alkaline earth oxides RO, wherein the aluminoborosilicate glass has a Young's modulus of less than about 69 GPa, and wherein −6 mol % <Σmodifiers−$Al_2O_3$<3 mol %.

12. The writable erasable marker board of claim 1 wherein the marker board further comprises an organic film structure which is laminated to at least one side of the glass sheet which provides anti-splinter functionality.

13. The writable erasable marker board of claim 1, wherein the marker board further comprises a decorative layer attached to at least one side of the glass sheet.

14. The writable erasable marker board of claim 1, wherein the shadow parallax to thickness ratio is less than about 0.75 measured at a 60 degree incident light angle.

15. A writable erasable marker board comprising:
a strengthened glass sheet having a front surface and a back surface wherein the glass sheet exhibits a thickness of less than 2.0 mm, a shadow parallax to thickness ratio of less than 1 when measured at a 60 degree incident light angle, an index of refraction of 1.5, a transmission haze of less than 40%, an RMS roughness in a range from about 50 nm up to about 500 nm, and a distinctness of image (DOI) of less than about 85; and
a magnetic or ferrous steel backing plate positioned on at least one side of the glass sheet such that when the marker board is vertical, a permanent magnet with maximum energy product of less than 10 MGOe will remain attached to the glass sheet through magnetic force only.

16. The writable erasable marker board of claim 15, wherein a permanent magnet with maximum energy product of less than 5 MGOe will remain attached to the glass sheet through magnetic force only.

17. The writable erasable marker board of claim 15, wherein a permanent magnet with maximum energy product of less than 1 MGOe will remain attached to the glass sheet through magnetic force only.

18. The writable erasable marker board of claim 15, wherein the marker board further comprises an organic film structure which is laminated to at least one side of the glass sheet which provides anti-splinter functionality.

19. The writable erasable marker board of claim 15, wherein the marker board further comprises a decorative layer attached to at least one side of the glass sheet.

20. The writable erasable marker board of claim 15, wherein the strengthened glass article further exhibits a fracture toughness of greater than 0.75 MPa·m$^{1/2}$, an abraded MOR of greater than 350 MPa, a Vickers hardness of at least 600 kgf/mm$^2$, a Young's Modulus of greater than 60 GPa, and a surface compressive stress of greater than 300 MPa.

21. The writable erasable marker board of claim 15, wherein the strengthened glass sheet has a surface compressive strength of at least 300 MPa.

22. The writable erasable marker board of claim 15, wherein the strengthened glass sheet has at least one compressively-stressed region near the front surface or the back surface, and wherein the compressively-stressed region has a layer depth of at least 20 microns.

23. The writable erasable marker board of claim 15, wherein the strengthened glass sheet has a thickness that is selected from the group consisting of less than 1.0 mm and less than 0.7 mm.

24. The writable erasable marker board of claim 15, wherein the strengthened glass article exhibits an MOR of greater than 475 MPa.

25. The writable erasable marker board of claim 15 further comprising a mounting means, wherein the mounting means is selected from the group consisting of (i) a magnetic layer on the back surface of the strengthened glass sheet, (ii) an adhesive layer on the back surface of the strengthened glass sheet, and (iii) a static cling layer on the back surface of the strengthened glass sheet.

26. The writable erasable marker board of claim 15 further comprising a mounting means, wherein the mounting means is selected from the group consisting of (i) one or more mounting holes formed in the strengthened glass sheet, (ii) one or more glass sheet hanging elements attached to the strengthened glass sheet, and (iii) one or more glass sheet framing elements attached to the strengthened glass sheet.

27. The writable erasable marker board of claim 15, wherein the glass is an ion-exchanged alkali-aluminosilicate glass comprising, in weight percent as oxides on a batched basis, 40-80% $SiO_2$, 0-28% $Al_2O_3$, 0-8% $B_2O_3$, 0-18% $Li_2O$, 0-10% $Na_2O$, 0-11% $K_2O$, 0-16% MgO, 0-18% CaO, 0-15% $CaF_2$, 0-20% SrO, 0-12% BaO, 0-8% ZnO, 0-20% $P_2O_5$, 0-8% $TiO_2$, 0-5% $ZrO_2$, 0-1% $SnO_2$, 0-1 $Sb_2O_3$, and 0-1% $As_2O_3$.

28. The writable erasable marker board of claim 15, wherein the glass is an ion-exchanged alkali-aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; and less than 50 ppm $As_2O_3$; wherein 12 mol % $\leq Li_2O+Na_2O+K_2O \leq 20$ mol % and 0 mol % $\leq MgO+CaO \leq 10$ mol %.

29. The writable erasable marker board of claim 15, wherein the glass is an ion-exchanged alkali-aluminosilicate glass comprising at least 50 mol % $SiO_2$, less than 10 mol % $B_2O_3$, and at least 8 mol % $Na_2O$, wherein the aluminoborosilicate glass is ion exchangeable, wherein a ratio $$\frac{Al_2O_3(mol\ \%) + B_2O_3(mol\ \%)}{\Sigma modifiers(mol\ \%)} > 1,$$

wherein $Al_2O_3$(mol %) > $B_2O_3$(mol %) and the modifiers are $Na_2O$ and, optionally, at least one oxide selected from the group consisting of alkali metal oxides $R_2O$ other than $Na_2O$ and alkaline earth oxides RO, wherein the aluminoborosilicate glass has a Young's modulus of less than about 69 GPa, and wherein −6 mol % < $\Sigma$modifiers−$Al_2O_3$ < 3 mol %.

* * * * *